US008855380B2

(12) United States Patent
Fourre et al.

(10) Patent No.: US 8,855,380 B2
(45) Date of Patent: Oct. 7, 2014

(54) DEVICE FOR IDENTIFYING A PERSON BY A PRINT THEREOF

(75) Inventors: Joel-Yann Fourre, Paris (FR); Sylvaine Picard, Paris (FR)

(73) Assignee: Morpho, Paris (FR)

( * ) Notice: Subject to any disclaimer, the term of this patent is extended or adjusted under 35 U.S.C. 154(b) by 322 days.

(21) Appl. No.: 13/266,529

(22) PCT Filed: Apr. 26, 2010

(86) PCT No.: PCT/EP2010/055514
§ 371 (c)(1),
(2), (4) Date: Dec. 30, 2011

(87) PCT Pub. No.: WO2010/125019
PCT Pub. Date: Nov. 4, 2010

(65) Prior Publication Data
US 2012/0106846 A1    May 3, 2012

(51) Int. Cl.
G06K 9/00 (2006.01)
(52) U.S. Cl.
CPC .................................... *G06K 9/0004* (2013.01)
USPC ......................................................... 382/124
(58) Field of Classification Search
CPC ................................................ G06K 9/00006
See application file for complete search history.

(56) References Cited

U.S. PATENT DOCUMENTS

| 3,975,711 | A |  | 8/1976 | MaMahon |
| 4,120,585 | A |  | 10/1978 | DePalma et al. |
| 4,340,300 | A |  | 7/1982 | Ruell |
| 4,428,670 | A |  | 1/1984 | Ruell et al. |
| 6,122,394 | A | * | 9/2000 | Neukermans et al. ........ 382/124 |
| 2002/0150284 | A1 | * | 10/2002 | Iwai .............................. 382/124 |
| 2004/0252867 | A1 | * | 12/2004 | Lan et al. ...................... 382/124 |
| 2005/0249389 | A1 | * | 11/2005 | Knowles ....................... 382/124 |
| 2006/0120576 | A1 | * | 6/2006 | Chen ............................. 382/124 |
| 2007/0279617 | A1 | * | 12/2007 | Sherman ......................... 356/71 |

FOREIGN PATENT DOCUMENTS

WO    WO 85/03362    8/1985

OTHER PUBLICATIONS

International Search Report for PCT/EP2010/055514, mailed May 25, 2010.
Written Opinion for PCT/EP2010/055514, mailed May 25, 2010.

(Continued)

*Primary Examiner* — Bhavesh Mehta
*Assistant Examiner* — Andrew Moyer
(74) *Attorney, Agent, or Firm* — Nixon & Vanderhye, PC

(57) ABSTRACT

The invention relates to a device (100) for identifying or authenticating a person by a print thereof, the identification or authentication device (100) including: a bearing means (102, 130) including a transparent base (130) and a transparent block (102) supported by said base (130) on which the part of the body carrying the print is pressed, the surface of the transparent block (102) on which the part of the body carrying the print is pressed having a test chart (132), the transparent block (102) being made of a flexible material that deforms and fits the shape of the part of the body carrying the print when the latter is pressed against the former, a means (106, 126) for capturing an image of said print and the test chart (132) through said bearing means (102, 130), a means (108) for analyzing the image of the deformed test chart (132), a means (110) for constructing a template of the print according to the print thus captured and the image of the test chart (132) thus analyzed, a means (114) for verifying the identity of the person or a means (114) for authenticating the person according to the template thus constructed.

9 Claims, 2 Drawing Sheets

(56) References Cited

OTHER PUBLICATIONS

Fatehpuria et al., "Acquiring a 2D rolled equivalent fingerprint image from a non contact 3d finger scan", *Biometric Technology for Human Identification III*, vol. 6202, 2006, pp. 62020C-1-62020C-8.

Saga et al., "High-resolution tactile sensor using the deformation of a reflection image", *Sensor Review*, vol. 27, No. 1, 2007, pp. 35-42.

Johnson et al., "Retrographic sensing for the measurement of surface texture and shape", *CVPR 2009*, Jun. 2009, No page numbers.

Preliminary Examination Report on patentability in English for PCT/EP2010/055514, dated Nov. 10, 2011.

* cited by examiner

DEVICE FOR IDENTIFYING A PERSON BY A PRINT THEREOF

This application is the U.S. national phase of International Application No. PCT/EP2010/055514 filed 26 Apr. 2010 which designated the U.S. and claims priority to FR patent application Ser. No. 09/52722 filed 27 May 2009, the entire contents of each of which are hereby incorporated by reference.

BACKGROUND OF THE INVENTION (1) Field of the Invention

The present invention concerns a device for identifying or authenticating a person by his print, as well as an identification or authentication method used by such an identification or authentication device. It finds an application in the field of biometric recognition and in particular in the field of identification or authentication by the analysis of finger or palm prints of a person.

(2) Description of Related Art

In biometrics, there are two processes:
identification, during which, from biometric information, the identity of a person is sought in a database; and
authentication, during which, from the claimed identity of a person and biometric data, identity is proved. The claimed identity can be obtained from a badge or a code.

Biometric recognition is used for protecting installations, such as buildings or machines, or for obtaining the granting of rights, such as for example the issue of an identity card, payment of a pension, etc. This technology makes it possible to dispense with access codes or cards that may be stolen or falsified, or makes it possible to authenticate the bearer of these cards or the holder of codes. Use of this technology reinforces security since the probability that two persons have two identical biometrics is almost zero.

In the remainder of the description, the term "print" will apply both to a fingerprint and to a palm print.

In the prior art, a method of identifying a person from his print consists of:
a step of capturing an image of the print to be identified by at least one sensor,
a step of generating a template associated with the image captured by extraction of points of interest of the image, and
a step of verifying the identity of the individual.

The step of verifying the identity of the individual consists for example of:
a step of searching, in a database of reference templates, for the reference template having the most similarities with said template associated with the captured image,
a step of measuring the resemblance between said template associated with the captured image and said reference template thus found, and
a step of taking a decision concerning the identity the person from the result of the measurement.

In the prior art, a method of authenticating a person from a print thereof consists of:
a step of capturing an image of the print to be identified by at least one sensor,
a step of generating a template associated with the captured image by extracting points of interest of the image, and
a step of authenticating the person.

The step of authenticating the person consists for example of:
a step of recovering the claimed identity of the person,
a step of seeking the reference template associated with the claimed identity thus recovered,
a step of measuring the resemblance between said template associated with the captured image and said reference template thus found, and
a step of taking a decision concerning the identity of the person from the result of the measurement.

The step of seeking the reference template may consist of a recovery of the template recorded on a card, or of a template found in a database using a code.

In the context of a three-dimensional (3D) capture of the print, such an identification method is implemented by means of an identification device that comprises a plurality of sensors of the camera or CCD type, associated with a plurality of illumination means and processing means which, using images captured by the various sensors, implement the comparison step, the measuring step and the decision-taking step. An identification based on a 3D capture makes it possible to obtain better results than an identification based on a two-dimensional (2D) capture.

Such an identification device is disclosed in the document US-A-2006-120576. When the images are captured, the person wishing to be identified must keep his hand immobile in front of the sensor so that the captured images are sufficiently sharp to be usable. Such a sensor is said to be contactless.

Such an operating mode constitutes a disadvantage since it is often difficult for a person to keep his hands sufficiently immobile during the capture step.

In the context of a two-dimensional (2D) capture of the print, an identification device comprises a transparent rigid plate, illumination means, a sensor and processing means. The illumination means and the sensor are disposed behind the plate on which the person presses his finger. The image thus captured is then processed by the processing means. Use of such an identification device entails the squashing of the finger when it is in abutment on the rigid plate and consequently deformation of the print. Usually the systems retrieve a faithful image of the print only for the part of the finger (or respectively of the palm) in contact with the plate but, depending on the pressing force on the plate or other physical factors, the print may be deformed to a greater or lesser extent and the imaged surface, of greater or lesser size, giving rise to an uncertain identification. Such a capture is said to be contactless. In particular with the palm, it is impossible to make an acquisition of the entire surface comfortably while squashing the hand on a plate.

A three-dimensional capture of the print makes it possible to increase the analysis surface and therefore the number of items of information relating to the print while reducing the deformations compared with a two-dimensional capture with contact.

BRIEF SUMMARY OF THE INVENTION

One object of the present invention is to propose a device for identifying or authenticating a person by his print and an identification or authentication method associated with the corresponding device that does not have the drawbacks of the prior art and in particular allows capture of a large surface area of the print while keeping ease of use of the contact-type sensors.

To this end, there is proposed a device for identifying or authenticating a person by his print, the identification or authentication device comprising:
bearing means comprising a transparent base and a transparent block supported by said base and on which the part of the body carrying the print is pressed, the surface of the transparent block on which the part of the body carrying the print is pressed having a test chart, the transparent block consisting of a flexible material that deforms and fits the shape of the part of the body carrying the print when the latter is pressed thereon, a means of capturing an image of said print and of the test chart through said bearing means, means of analysing the image of the deformed test chart, means of constructing a template of the print using the image of the test chart thus analysed, means of verifying the identity of the person or means for authenticating the person from the template thus constructed.

Advantageously, the bearing means comprise a rigid frame secured to the base and forming with the latter a receptacle in which the transparent block is constrained.

Advantageously, the test chart is transparent to certain wavelengths and opaque for others.

Advantageously, the surface of the transparent block having the test chart is preformed according to the type of print that may be identified.

Advantageously, the transparent block is of the silicone envelope type containing silicone gel or a liquid.

According to a particular embodiment, the axis of sight of the capture means is orthogonal to the base.

According to another particular embodiment, the axis of sight of the capture means forms, with the normal to the base, an angle larger than the total reflection limit angle of the transparent block.

According to a particular embodiment, the means of constructing the template of the print comprise means of calculating a geometric transformation of the deformed test chart into the non-deformed test chart, geometric transformation means designed to apply said geometric transformation thus calculated to the captured image of the print, and means of generating a template from the thus transformed image of the print.

According to another particular embodiment, the means of constructing the template of the print comprise means of approximating the three-dimensional surface of the test chart, means of applying the captured image of the print to the three-dimensional surface thus approximated, and means of generating a template from the thus transformed image of the print.

The invention also proposes a method of identifying or authenticating a person by his print, said method being characterised in that it comprises the steps of:

pressing the print to be identified on a transparent block supported by a transparent base, the surface of the transparent block on which the part of the body carrying the print is pressed has a test chart, the transparent block consisting of a flexible material that deforms and fits the shape of the part of the body carrying the print when the latter is pressed thereon, capturing an image of the print and of the test chart through said bearing means, analysing the image of the deformed test chart, constructing a template of the print from the image of the test chart thus analysed, verifying the identity of the person or authenticating the person from the test chart thus constructed.

According to a particular embodiment, the step of constructing the template of the print comprises a step of calculating a geometric transformation of the deformed test chart into the non-deformed test chart, a step of applying said thus calculated geometric transformation to the captured image of the print and a step of generating a template from the thus transformed image of the print.

According to another particular embodiment, the step of constructing the template of the print comprises a step of approximating the three-dimensional surface of the test chart, a step of applying the captured image of the print on the three-dimensional surface thus approximated, and a step of generating a template from the thus transformed image of the print.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

In the remainder of the description, reference will be made mainly to identification, whether for the device or for the method. The difference between identification and authentication lies in the processing of the template generated, which is compared with a set of reference templates in a database in the case of identification and is compared with a reference template in the case of authentication, a reference template that is obtained from a badge or a code for example.

Figure 1:
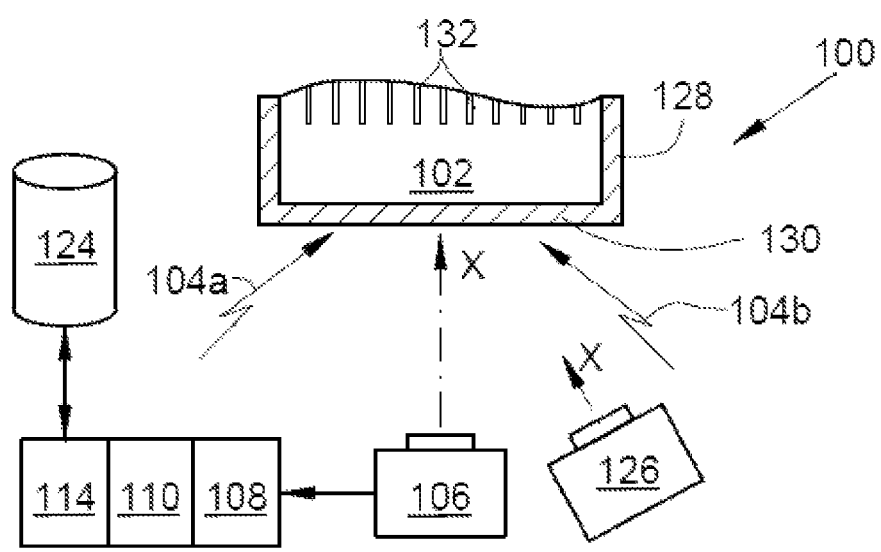
FIG. 1 is a schematic representation of a device for identifying or authenticating a person from his print according to the invention.

FIG. 1 shows a device 100 for identifying or authenticating a person by his print. The identification device 100 comprises:

bearing means 102, 130 comprising a transparent base 130 and a transparent block 102 supported by the base 130 and on which the part of the body carrying the print is pressed, the surface of the transparent block 102 on which the part of the body carrying the print is pressed has a test chart 132, the transparent block 102 consisting of a flexible material that deforms and fits the shape of the part of the body carrying the print when the latter is pressed thereon, a means 106, 126 of capturing an image of said print and of the test chart 132 through said bearing means 102, 130, means 108 of analysing the image of the test chart 132 that is deformed by the pressure exerted by the part of the body carrying the print, means 110 of constructing a template of the print from the image of the print thus captured and the image of the test chart 132 thus analysed, means 114 of verifying the identity of the person from the template thus constructed.

The surface of the transparent block 102 on which the part of the body carrying the print is pressed constitutes the acquisition surface.

In the case of an authentication device 100, the verification means 114 are replaced by means 114 of authenticating the person from the template thus constructed.

The capture means 106, 126 is disposed downstream of the bearing means 102, 130.

Figure 2:
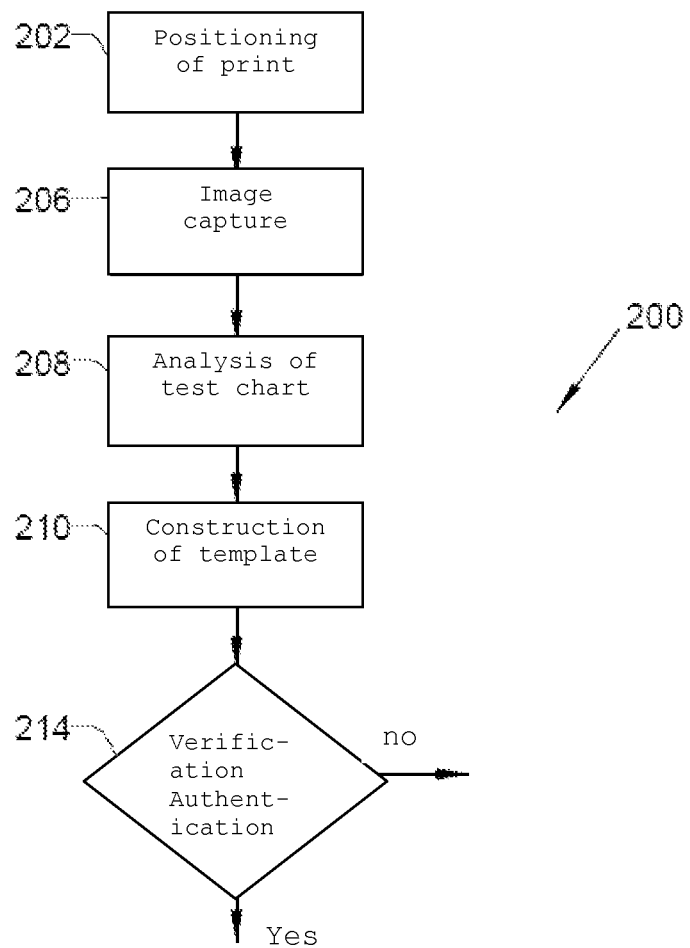
FIG. 2 shows an algorithm of a method of identifying or authenticating a person from his print according to the invention.

FIG. 2 shows a method 200 of identifying or authenticating a person by his print. The identification method 200 is implemented by the identification device 100 according to the invention. The identification method 200 comprises the steps performed by the identification device 100:

- pressing 202 the print to be identified on the transparent block 102,
- capturing 206 an image of the print and of the test chart 132 through said bearing means 102, 130,
- analysing 208 the image of the deformed test chart 132 using the image thus captured,
- constructing 210 the template of the print using the image of the print thus captured and the image of the test chart 132 thus analysed,
- verifying 214 the identity of the person from the template thus constructed.

In the case of an authentication method 200, the verification step 214 is replaced by a step 214 of authenticating the person from the template thus constructed.

Such an identification device 100 thus allows capture of an image of the print to be identified and transformation thereof into a template, the print being held in position during the capture of the image by means of the presence of the flexible transparent block 102. The hand or finger are pressed on the transparent block 102 during the pressing step 202 and is held thereon. Movements of the hand of the person are thus avoided and the images captured are of good quality while making it possible to generate and compare templates of the print to be identified.

The transparent block 102 is of the silicone envelope type containing silicone gel or a liquid.

The materials constituting the bearing means 102, 130 must be optically compatible with an image capture through the base 130 and the transparent block 102. These materials must thus be highly transparent and non-diffusing. The base 130 is for example made from a transparent plastics material (PMMA, PC) or glass.

It is said that the transparent block 102 deforms and fits the shape of the print when, under the pressure forces of the finger or hand, the transparent block 102 fits the shape of the finger or respectively of the hand the print of which is to be identified. The surface of the transparent block 102 on which the print bears is chosen so as to promote optical coupling with the skin. The material constituting the surface of the transparent block 102 must therefore be sufficiently flexible to limit the presence of a film of air between the skin and the transparent block 102. Silicone is a particularly well suited material.

The pressure exerted by the finger or hand must enable the transparent block 102 to be squashed without the skin of the finger or hand being squashed excessively as in the case of the prior art.

In the case of a palm print, the degree to which the hand is pressed in is around 1 cm.

In the case of a fingerprint, the finger is pressed in by around 0.4 cm.

The capture means 106, 126 that is used during the capture step 206 is preferably of the camera type, the axis of sight of which, respectively X, X', is oriented towards the base 130 so as to see the print to be identified by transparency through the base 130, the transparent block 102 and the test chart 132. In order to improve the illumination of the print to be identified, illumination means 104a and 104b taking the form of lamps are disposed on either side of the axis of sight of the camera 106, 126 used.

The illumination means 104a and 104b can be combined in different ways with the capture means 106, 126.

According to a first example, the axis X of the capture means 106 may be orthogonal to the acquisition surface, which is parallel to the base 130, and the axis of each illumination means 104a, 104b may form, with the acquisition surface, an angle less than the total reflection limit angle of the transparent block 102.

According to a second example, the axis X of the capture means 106 may be orthogonal to the acquisition surface, which is here parallel to the base 130, and the axis of the each illumination means 104a, 104b may form, with the normal to the acquisition surface, an angle greater than the total reflection limit angle of the transparent block 102. The illumination is then in total reflection on the acquisition surface of the transparent block 102 when it is not in contact with a finger.

According to a third example, the axis X of the capture means 106 may form, with the normal to the acquisition surface, which is here parallel to the base 130, an angle greater than the total reflection limit angle of the transparent block 102, and the axis of the illumination means 104a, 104b is orthogonal to the acquisition surface, which is here parallel to the base 130. The illumination is then in total reflection on the acquisition surface of the transparent block 102 when it is not in contact with a finger.

According to a fourth example, the axis X of the capture means 106 may form, with the normal to the acquisition surface, which is here parallel to the base 130, an angle greater than the total reflection limit angle of the transparent block 102, and the axis of the illumination means 104a, 104b also forms, with the normal to the acquisition surface, which is here parallel to the base 130, an angle greater than the total reflection limit angle of the transparent block 102. The axis X of the capture means 106 and the axis of the illumination means 104a, 104b are then substantially symmetrical with respect to the normal to the acquisition surface (the case of total reflection imaging in shadowgraphy).

During the analysis step 208, the analysis means 108 analyse the image of the test chart 132 as it appears deformed on the captured image.

During the construction step 210, the construction means 110 reconstruct a template of the print from the image of the captured print and the image of the test chart 132 thus analysed by extracting points of interest of the image of the print.

For example, in the case of a two-dimensional processing, the step 210 of constructing the template of the print comprises a step of calculating a geometric transformation of the deformed test chart 132 into the non-deformed test chart 132, a step of applying said geometric transformation thus calculated to the captured image of the print, and a step of generating a template from the image thus formed of the print.

For this purpose, the means 110 of constructing the template of the print comprise means of calculating a geometric transformation of the deformed test chart 132 into the non-deformed test chart 132, geometric transformation means provided for applying said geometric transformation thus calculated to the captured image of the print, and means of generating a template from the thus transformed image of the print.

Thus, from the deformed image of the test chart 132 and through knowledge of the non-deformed form thereof, the calculation means generate a geometric transformation function that makes it possible to rectify the image of the deformed test chart 132 into an image of the non-deformed test chart 132.

The geometric transformation function is then applied to the image of the captured print in order to rectify it. After which, the template can be generated.

In the case of the calculation and application of a geometric transformation, this geometric transformation may be a homography.

For example, in the case where the test chart 132 is shown in the form of a grid consisting of cells, a nomography making it possible to pass from each cell in the deformed grid to a straight cell at the required resolution is calculated and the position of the deformed cells estimated. A three-dimensional approximation of the surface is thus made by plane facets (approximation by pieces).

Another method is based on the use of a three-dimensional model such as for example a cylinder, the diameter of which is adapted according to the finger and deformation observed. Once the characteristics of the model are known, the reverse transformation is applied in order to unfold the print.

The size of the cells is substantially greater than the frequency of the peaks in order not to pose any problem of detection of one of these two items of information. The cells will be at least 3 mm square.

If it is not wished to use such an approximation, the distortion field observed during the step of approximating the three-dimensional surface is established and the reverse movement field is applied, making it possible to adjust the grid to the straight grid desired at the desired resolution. In the case of three-dimensional processing, the step of constructing the template of the print comprises a step of approximating the three-dimensional surface of the test chart 132, a step of applying the captured image of the print to the three-dimensional surface thus approximated, and a step of generating a template from the thus transformed image of the print.

For this purpose, the means 110 of constructing the template of the print comprise means of approximating the three-dimensional surface of the test chart 132, means of applying the captured image of the print to the three-dimensional surface thus approximated, and means of generating a template from the thus transformed image of the print.

Thus, from the deformed image of the test chart 132 and through knowledge of the non-deformed form thereof, the approximation means determine the three-dimensional surface of the part of the body carrying the print.

The application means apply to this surface the image of the captured print, so as to trace the image of the captured print on the approximated surface. After which, the template can be generated.

In this case, it is the templates relating to three-dimensional prints that are generated.

In order to be made compatible with the databases that generally consist of templates relating to two-dimensional prints, a step of rectifying the image of the print applied to the three-dimensional surface can be carried out prior to the step of generating the template.

The document entitled "High-Resolution Structured Light Range Scanner with Automatic Calibration" written by A. M. Bronstein et al and published on 4 Aug. 2003 presents, in the context of a facial analysis, steps of approximating the three-dimensional surface of a test chart and a step of applying the captured image of the face on the three-dimensional surface thus approximated.

The outline of the test chart 132 is known to the analysis means 108 and construction means 110. It may for example be two sets of secant straight lines forming a grid, these straight lines being as fine as possible in order to limit degradation of the image of the print while remaining sufficiently visible to be analysed.

The test chart 132 is preferably transparent for certain wavelengths and opaque for others, and thus the print is visible through the lines, which may then be wider.

As in the case of the identification method of the prior art, the verification step 214 may for example consist of:

a step of seeking, in a database 124 of reference templates, the reference template having the most similarities with said template associated with the captured image, a step of measuring the resemblance between said template associated with the captured image and said reference template thus found, and a decision-taking step concerning the identify of the person using the result of the measurement.

As in the case of the authentication method of the prior art, the authentication step 214 may for example consist of:

a step of recovering the claimed identity of the person, a step of seeking the reference template associated with the claimed identity thus recovered, a step of measuring the resemblance between said template associated with the captured image and said reference template thus found, and a decision-taking step concerning the identity of the person using the result of the measurement. in the context of an identification by template relating to a three-dimensional print, the steps of identification 214 and authentication 214 implement similar processes. Information such as the local curvature of the finger and the orientation of the print naturally resulting from the acquisition mode enhance the biometric representation of the print.

In order to constrain the transparent block 102 and prevent lateral flow thereof when the finger or hand is pressed on, the bearing means also comprise a rigid frame 128 secured to the base 130 and forming with the latter a receptacle in which the transparent block 102 is constrained. The frame 128 is in a single piece with the base 130 and is produced from the same material. Expansion of the transparent block 102 under the effect of the pressure of the finger or hand then takes place solely by vertical expansion outside the bearing zones. The test chart 132 then deforms almost only vertically and very little horizontally, thus facilitating analysis of the image thereof.

In order to avoid losing information relating to the print to be identified, the test chart 132 is translucent, thus revealing by transparency the print to be identified. In order to facilitate the separation of the test chart 132 and the print on the captured image, the test chart 132 is produced in a colour different from that of the print to be identified. Thus a filtering of the captured image by colour will make it possible to eliminate the test chart 132 while keeping the information relating to the print to be identified. The test chart 132 is thus transparent for certain wavelengths and opaque for others. For example, the test chart 132 absorbs red and allows green to pass. By capturing the image of the test chart 132 and of the print with a colour camera, the image of the test chart and print is situated on the red channel and the image of the print not degraded by the test chart 132 is situated on the green channel.

In order to facilitate the positioning of the finger or hand of the person to be identified, and to ensure uniform pressure over practically all the test chart 132, the surface of the transparent block 102 having the test chart 132 is preformed according to the type of print that may be identified. In particular, in the case of a palm print to be identified, said surface will take a convex shape at the palm and a hollow shape at the beginning of the fingers. This performing allows natural positioning of the user and limits squashing of the transparent block 102.

In a first embodiment, the axis of sight X of the capture means 106 is orthogonal to the acquisition surface, which is here parallel to the base 130.

In a second embodiment, the axis of sight X' of the capture means 126 forms, with the normal to the acquisition surface, which is here parallel to the base 130, an angle greater than the total reflection limit angle of the transparent block 102.

In the case of a silicone transparent block 102, the refractive index is around 1.46 and the total reflection limit angle is approximately 43°. Thus the imaging device and in particular the capture means 106 are in frustrated total reflection. If a finger is in contact with the surface of the transparent block 102, the finger is seen by the capture means 106. Otherwise there is total reflection, and the capture means 106 receives no relevant image.

This positioning also affords better numerical stability of the steps of approximation of the three-dimensional surface of the test chart and construction 210, that is to say the quantities involved in the three-dimensional reconstruction are larger, and the errors introduced in the approximation and construction steps are smaller. This therefore in practice makes it possible to obtain a more faithful three-dimensional reconstruction. When the image of the print applied to the three-dimensional surface is rectified, prior to the generation of the template, the latter has, compared with acquisition in contact on a plate, fewer distortions and a superior surface.

Thus, if knowledge of the three-dimensional information is not necessary, the points of the print as they appear on the three-dimensional surface are adjusted to a flat surface and a good resolution. This thus makes it possible to use existing bases or to connect to existing systems.

Naturally the present invention is not limited to the examples and embodiments described and depicted but is capable of numerous variants accessible to persons skilled in the art.

The invention claimed is:

1. A device (100) for identifying or authenticating a person by means of his print, the identification or authentication device (100) comprising:
    bearing means (102, 130) comprising a transparent base (130), a rigid frame (128) secured to the base (130) and consisting of lateral walls issued from the base (130) in a direction opposite to a means (106, 126) of capturing and forming with the base (130) a receptacle which is closed except at a face of the receptacle opposite to the base (130), and a transparent block (102) supported by said base (130), filling said receptacle, constrained in the receptacle and on which a part of a body carrying the print is pressed through said face, a surface of the transparent block (102) on which the part of the body carrying the print is pressed having a test chart (132), the transparent block (102) consisting of a flexible material that deforms and fits the shape of the part of the body carrying the print when the latter is pressed thereon,
    the means (106, 126) of capturing an image of said print and of the test chart (132) through said bearing means (102, 130),
    means (108) of analyzing the image of the deformed test chart (132),
    means (110) of constructing a template of the print using the image of the test chart (132) thus analyzed, characterized in that the means (110) of constructing the template of the print comprise means of calculating a geometric transformation of the deformed test chart (132) into a non-deformed test chart (132), geometric transformation means provided for applying said geometric transformation thus calculated to the captured image of the print, and means of generating a template from the thus transformed image of the print, and
    means (114) of verifying the identity of the person or means (114) for authenticating the person from the template thus constructed.

2. The identification or authentication device (100) according to claim 1, characterized in that the test chart (132) is transparent for certain wavelengths and opaque for others.

3. The identification or authentication device (100) according to claim 1, characterized in that the surface of the transparent block (102) having the test chart (132) is preformed according to the type of print that may be identified.

4. The identification or authentication device (100) according to claim 1, characterized in that the transparent block (102) is of the silicone envelope type containing silicone gel or a liquid.

5. The identification or authentication device (100) according to claim 1, characterized in that an axis of sight of the capture means (106) is orthogonal to the base (130).

6. The identification or authentication device (100) according to claim 1, characterized in that an axis of sight of the capture means (126) forms, with the normal to the base (130), an angle greater than the total reflection limit angle of the transparent block (102).

7. The identification or authentication device (100) according to claim 1, characterized in that the means (110) of constructing the template of the print comprise means of approximating a three-dimensional surface of the test chart (132), means of applying the captured image of the print on the three-dimensional surface thus approximated, and means of generating a template from the thus transformed image of the print.

8. A method (200) of identifying or authenticating a person by means of his print, characterized in that it comprises the steps of:
    pressing (202) the print to be identified on a transparent block (102), the transparent block (102) being supported by a transparent base (130), filling a receptacle formed by the transparent base (130) and a rigid frame (128) secured to the base (130) and consisting of lateral walls issued from the base (130) in a direction opposite to a means (106, 126) of capturing, the receptacle being closed except at a face of the receptacle opposite to the base (130) through which the print to be identified presses on the transparent block (102), which is constrained in a said receptacle, a surface of the transparent block (102) on which a part of a body carrying the print is pressed has a test chart (132), the transparent block (102) consisting of a flexible material that deforms and fits the shape of the part of the body carrying the print when the latter is pressed thereon,
    capturing (206) an image of the print and of the test chart (132) through said bearing means (102, 130),
    analyzing (208) the image of the deformed test chart (132),
    constructing (210) a template of the print from the image of the test chart (132) thus analyzed, characterized in that the step of constructing the template of the print comprises a step of calculating a geometric transformation of the deformed test chart (132) into a non-deformed test chart (132), a step of applying said geometric transformation thus calculated to the captured image of the print, and a step of generating a template from the thus transformed image of the print, and
    verifying (214) the identity of the person or authenticating (214) the person from the test chart thus constructed.

9. The identification or authentication method according to claim 8, characterized in that the step of constructing the template of the print comprises a step of approximating a three-dimensional surface of the test chart (132), a step of applying the captured image of the print to the three-dimensional surface thus approximated, and a step of generating a template from the thus transformed image of the print.

\* \* \* \* \*